United States Patent
Grabarnik et al.

(10) Patent No.: US 8,103,535 B2
(45) Date of Patent: Jan. 24, 2012

(54) EVALUATION OF FITNESS FOR A CONTRACTUAL AGREEMENT RELATED TO PROVISIONING INFORMATION TECHNOLOGY SERVICES

(75) Inventors: Genady Y. Grabarnik, Scarsdale, NY (US); Dimitri Kanevsky, Ossining, NY (US); Heiko Ludwig, San Francisco, CA (US); Larisa Shwartz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 590 days.

(21) Appl. No.: 12/021,820

(22) Filed: Jan. 29, 2008

(65) Prior Publication Data

US 2009/0192842 A1    Jul. 30, 2009

(51) Int. Cl.
*G06Q 10/00* (2006.01)
*G06Q 30/00* (2006.01)

(52) U.S. Cl. ............ 705/7.23; 705/7.27; 705/7.35; 705/7.36; 705/7.38

(58) Field of Classification Search ............ None
See application file for complete search history.

(56) References Cited

U.S. PATENT DOCUMENTS

| | | | |
|---|---|---|---|
| 5,893,905 A | 4/1999 | Main et al. ............ 705/11 |
| 7,058,704 B1 | 6/2006 | Mangipudi et al. ............ 709/223 |
| 7,099,936 B2 | 8/2006 | Chase et al. ............ 709/223 |
| 7,149,698 B2 * | 12/2006 | Guheen et al. ............ 705/319 |
| 2002/0107743 A1 * | 8/2002 | Sagawa ............ 705/17 |
| 2003/0236745 A1 * | 12/2003 | Hartsell et al. ............ 705/40 |
| 2004/0260602 A1 * | 12/2004 | Nakaminami et al. ............ 705/11 |
| 2005/0010456 A1 * | 1/2005 | Chang et al. ............ 705/7 |
| 2006/0080117 A1 * | 4/2006 | Carr et al. ............ 705/1 |
| 2006/0080156 A1 | 4/2006 | Baughn et al. ............ 705/7 |
| 2007/0150329 A1 * | 6/2007 | Brook et al. ............ 705/8 |
| 2007/0180061 A1 | 8/2007 | Bantz et al. ............ 709/219 |
| 2008/0010293 A1 * | 1/2008 | Zpevak et al. ............ 707/10 |
| 2008/0300837 A1 | 12/2008 | Buco et al. ............ 703/6 |

OTHER PUBLICATIONS

Rosario et al. "Probabilistic qos and soft contracts for transaction based web services" In: Proc. IEEE Int. Conf. on of Web Services ICWS, pp. 126-133 (2007).*
Keller et al. "The WSLA Framework: Specifying and Monitoring Service Level Agreements for Web Services". Journal of Nework and Systems Management. vol. 11, No. 1, p. 57-81.*
"Service Level Management Using IBM Tivoli Service Level Advisor and Tivoli Business Systems Manager" (2004) . IBM.*
Cardoso et al. "Quality of service for workflows and web service processes" (2004) Journal of Web Semantics, p. 1-40.*
McConnell et al. "Practice service Level Management" (2004) Cisco Press.*

(Continued)

*Primary Examiner* — Scott L Jarrett
*Assistant Examiner* — Sujay Koneru
(74) *Attorney, Agent, or Firm* — Harrington & Smith (57) ABSTRACT

The exemplary embodiments of the invention provide computer programs, methods, apparatus and systems that describe techniques providing improved evaluation of business processes based on considerations such as throughput and/or parallelization. As a non-limiting example, such techniques may be useful for evaluating agreements between entities, such as service level agreements between a service provider and another entity (e.g., a supplier or customer of the service provider), for example. In one exemplary embodiment of the invention, a method includes: obtaining a workflow model having a plurality of atomic processes, each atomic process having a distribution of throughput; determining an overall distribution of throughput for the workflow model using the distributions of throughput of the atomic processes; and outputting a determination of whether an agreement relating to the workflow model is fit based on the determined overall distribution of throughput.

9 Claims, 2 Drawing Sheets

OTHER PUBLICATIONS

Muller "Managing Service Level Agreements" (1999) International Journal of Network Management.*

BMC Software Strengthens Focus on Service Level Management with PATROL for SLM (2000) BMC Software Inc.*

Pautasso et al. "Parallel Computing Patterns for Grid Workflows" (2006) in Proceedings of the Workshop on Workflows in Support of Large-Scale Science, Paris, France.*

Buco M. J. et al., "Utility computing SLA management based upon business objectives," 2004, pp. 159-178, IBM Systems Journal, vol. 43, No. 1.

Cormen et al., "Introduction to Algorithms," 2001, 4 pp., MIT Press, Cambridge, MA.

Gu X. et al., "QoS-Assured Service Composition in Managed Service Overlay Networks," 2003, pp. 1-8, Proc. $23^{rd}$ International Conference on Distributed Computing Systems.

Keller A. et al., "The CHAMPS System: Change Management with Planning and Scheduling," pp. 1-15, Proc. $9^{th}$ IEEE/IFIP Network Operations and Management Symposium Apr. 2004, Published as IBM Research Report RC22882 (W0308-089) Aug. 25, 2003.

Shiryaev A. N., Probability (Graduate Texts in Mathematics), 1995, pp. 260-267, $2^{nd}$ ed. Berlin: Springer.

Shwartz L. et al., "Automating the Deployment Decisions in Distributed Systems," 5 pp. AC 2006.

IBM Software, WebSphere® Business Modeler, internet: http://www-306.ibm.com/software/integration/wbimodeler/.

Zeng, L., "Quality Driven Web Services Composition," WWW2003, May 20-24, 2003, Budapest, Hungary.

Ardagna, et al, "Adaptive Service Composition in Flexible Processes," IEEE Transactions on Software Engineering, vol. 33, No. 6, Jun. 2007.

Grabarnik, G., "Management of Service Process QoS in a Service Provider—Service Supplier Environment", $9^{th}$ IEEE International Conference on E-Commerce, Workshop on Global Business Services Delivery Platforms (CEC-EEE Jul. 2007).

Aho, et al, "Compilers: Principles, Techniques, and Tools," pp. 602-623, Aug. 31, 2006, $2^{nd}$ Edition.

* cited by examiner

EVALUATION OF FITNESS FOR A CONTRACTUAL AGREEMENT RELATED TO PROVISIONING INFORMATION TECHNOLOGY SERVICES

TECHNICAL FIELD

The exemplary and non-limiting embodiments of this invention relate generally to business processes and, more specifically, to evaluating business processes and/or evaluating agreements between business entities in comparison to business processes.

BACKGROUND

The following abbreviations are utilized herein:
AP atomic process
BP business process
DAG directed acyclic graph
IT information technology
QOS quality of service
SBP stochastic business process
SLA service level agreement
SyBP synchronized business process
SySBP synchronized stochastic business process Outsourcing of information technology (IT) services emerged as a way for non-IT organizations to increase efficiency, increase capacity and mitigate risks associated with supporting an IT environment. Many businesses utilize outsourced IT services to meet their business requirements. These business requirements may be static or dynamic. IT service providers generally face an increasingly competitive landscape in addition to growing government and industry requirements. In pursuit of their goal of maximizing customer satisfaction, service providers generally seek to employ intelligent business solutions which provide deep analysis and orchestration of business processes and capabilities for optimizing the level of service and cost.

The global information society is an open service customer-driven market. User perspective influences functionality, design, and management of services. Information Technology Infrastructure Library (ITIL®) best practices and ISO 20000 are representations of this new approach. Traditional technology-centric methodology for defining services is often being replaced by services defined by what they provide to the users.

As the structure of the IT outsourcing industry moves towards a global service-driven market, the role of service providers is undergoing noticeable change. Service providers are generally no longer willing to build and use services for a single customer or internal business unit but instead are looking to utilize single service management solutions using shared resources for a wide range of customers and services. The fact that resources may have different owners and users should be taken into account. Therefore, multi-customer issues may play a critical role in this environment.

There is increasing competition among service providers to offer new and customized services and provide customers with management functionality that enables customers to monitor, control and optimize these services. Thus, IT service providers generally strive to introduce more sophisticated and automated procedures into service management in order to meet customer demands and remain competitive.

SUMMARY

In an exemplary embodiment of the invention, a method comprising: obtaining a workflow model comprising a plurality of atomic processes, each atomic process having a distribution of throughput; determining an overall distribution of throughput for the workflow model using the distributions of throughput of the atomic processes; and outputting a determination of whether an agreement relating to the workflow model is fit based on the determined overall distribution of throughput.

In another exemplary embodiment, a program storage device readable by a machine, tangibly embodying a program of instructions executable by the machine for performing operations, said operations comprising: obtaining a workflow model comprising a plurality of atomic processes, each atomic process having a distribution of throughput; determining an overall distribution of throughput for the workflow model using the distributions of throughput of the atomic processes; and outputting a determination of whether an agreement relating to the workflow model is fit based on the determined overall distribution of throughput.

In another exemplary embodiment, a processing device comprising: an input configured to receive a workflow model comprising a plurality of atomic processes, each atomic process having a distribution of throughput; a processing unit coupled to the input and configured to determine an overall distribution of throughput for the workflow model using the distributions of throughput of the atomic processes; and an output coupled to the processing unit and configured to output a determination of whether an agreement relating to the workflow model is fit based on the determined overall distribution of throughput.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

The following terms, as utilized herein, are defined as follows.

The term "entity" refers to an individual, group, organization, business or company. Depending on the context of usage, the term may also refer to other units, such as a department or other internal organizational unit of a company (e.g., a service provider), as a non-limiting example.

An IT service provider or "service provider" is an entity that is responsible for the provisioning of services (e.g., IT services) to one or more other entities. In ISO 20000 terminology, such service providers may be referred to as "external service providers."

The term "customer" refers to an entity that buys services which are either used by the entity (e.g., users in the organization) or by customers of the entity. Note that according to this definition, a service provider organization can itself be a customer. Generally, the customer defines the service requirements.

A "supplier" is an entity that provides various services or products to one or more other entities. What distinguishes a supplier from a service provider is that a supplier usually provides basic (or atomic) service(s) and generally does not control the infrastructure.

Participants in IT service management are referred to as "stakeholders."

An "agreement" is considered to be a contract (e.g., formal or informal, written or oral) between two or more entities that provides guidance regarding the interaction(s) (e.g., providing of services or products) between the respective entities.

As a non-limiting example, a service level agreement (SLA) is an agreement that exists between a service provider and one or more other entities (e.g., a supplier or a customer). SLAs commonly include segments to address: a definition of services, performance measurement, problem management, customer duties, warranties, disaster recovery and termination of the agreement, as non-limiting examples. While various exemplary embodiments of the invention may be discussed below in terms of one or more SLAs, it should be appreciated that an SLA is only one example of the types of agreements with which the exemplary embodiments of the invention may be utilized.

As another non-limiting example, an operational level agreement (OLA) is an internal agreement that exists between elements or entities (e.g., departments) of a larger entity. For example, two departments or sections of a service provider may have an OLA between them that covers the delivery of products or services within the service provider.

A "value" is defined as a magnitude or quantity. As non-limiting examples, a value may comprise: a scalar (e.g., a number), a vector, a tensor, a function or an n-dimensional expression. As non-limiting examples, a value may be static and/or dynamic. As further non-limiting examples, a value may be a real number or a complex number.

A "stochastic process" is a process whose behavior is non-deterministic in that the future state of the process is not deterministic with respect to a current state of the process. A stochastic process or an attribute or quality thereof may be represented using a probability distribution, for example.

An "atomic process" is defined as a process that performs a simple task or action and terminates successfully. As utilized herein, an atomic process (AP) may have zero or more inputs (zero being the "start atomic process") and zero or more outputs (zero being the "end atomic process").

A "directed acyclic graph" is a directed graph containing no directed cycles.

Figure 1:
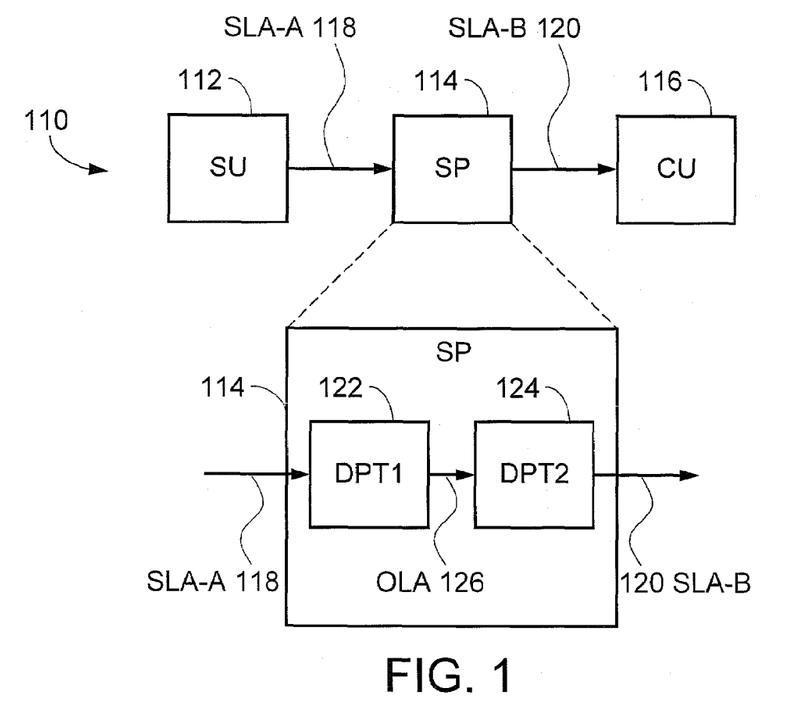
FIG. 1 shows a macro-level organizational model of the entities, interactions and agreements in an exemplary business arrangement.

FIG. 1 shows a macro-level organizational model 110 of the entities, interactions and agreements in an exemplary business arrangement. The model 110 includes a supplier (SU) 112, a service provider (SP) 114 and a customer (CU) 116. The SU 112 provides products and/or services to the SP 114. The SP 114 provides services (e.g., IT services) to the CU 116. The interactions between the SU 112 and the SP 114 are governed by a first service level agreement (SLA-A) 118. As a non-limiting example, the SLA-A 118 may describe the products and/or services to be provided to the SP 114 by the SU 112. The interactions between the SP 114 and the CU 116 are governed by a second service level agreement (SLA-B) 120. As a non-limiting example, the SLA-B 120 may describe the products and/or services to be provided to the CU 116 by the SP 114.

In further exemplary embodiments, and as shown in FIG. 1, the SP 114 may itself comprise a plurality of entities, such as a first department (DPT1) 122 and a second department (DPT2) 124. The interactions between DPT1 122 and DPT2 124 are governed by an operational level agreement (OLA) 126. As a non-limiting example, the OLA 126 may describe the support (e.g., services, products, timelines) required in order for the SP 114 to provide the services that are described by the SLA-B 120.

Generally, for management of IT services, an SLA is a conventional method of regulating a service provider's contractual obligations. The collaboration among the various stakeholders of the delivery and management of IT services is an integral part of IT Service Management and may be thoroughly analyzed. To date, attention has been directed primarily to the technology for service delivery rather than issues concerning collaboration.

A customer's infrastructure may span many locations and sites (e.g., it may be globally distributed). Technological changes and business trends have resulted in customers and users playing a significant role in service delivery. Corporate customers, for whom responsive and efficient IT services may be critical to their core business, are becoming more knowledgeable on the services that their company has outsourced. Customers may have real-time requirements and demand reliability and robustness. In turn, IT service providers may be called upon to provide such reliable and robust services in order to support and retain their clients' business.

Cost effective, competitive IT service management is generally a challenging task. In order to be successful, an IT service provider may have to: design a service management architecture that satisfies their operational model, design appropriate service management processes, identify suppliers and other stakeholders and functional components that allow them to interact, define management interfaces for external access, model management information at different levels and establish shared knowledge resources that achieve security by employing authentication and access control.

A service management architecture that ensures efficient interactions between different stakeholders may be essential for a service provider. A modeling approach is often used to structure the management functionality in an architectural framework in order that: control and management functions can be distributed between different stakeholders, the management services available at each interface in the architecture can be designated and the management information model for each stakeholder can be specified.

In light of the above, it is generally preferable to use a suitable agreement (e.g., SLA) for each of the various interactions. Specifically, for a given complex service process description, the process may be partitioned into sub-processes that may be performed by different parties and regulated by different agreements (e.g., SLAs) that define the contractual commitments of these parties. For example, generally it may be desirable: to determine whether an agreement between a service provider and one or more customers will be efficient in comparison with an agreement between the service provider and its suppliers (e.g., internal or external suppliers); to determine which supplier is the most appropriate in order to satisfy a given agreement with a customer; and to determine if a given agreement will be suitable to meet the needs of a given business process and/or customer.

One prior art solution is to use an agreement (e.g., SLA) and subsequently change it (e.g., modify its terms or conditions) if the agreement becomes unsuitable or contains undesirable elements or clauses. However, this approach may be unsuitable in various circumstances.

Reference with regard to selection of agreements between business entities may be made to commonly-assigned U.S. patent application Ser. No. 11/755,911 by Buco et al., "Methods, Computer Program Products And Apparatus Providing Improved Selection of Agreements Between Entities," which is incorporated by reference herein in its entirety.

Reference with regard to QoS-driven selection techniques may be made to Zeng et al., "Quality Driven Web Services Composition," WWW2003, May 20-24, 2003, Budapest, Hungary.

Reference with regard to techniques for providing flexible composed Web services, expressed as processes composed of abstract Web services, may be made to Ardagna et al, "Adaptive Service Composition in Flexible Processes," IEEE Transactions on Software Engineering, Vol. 33, No. 6, June 2007.

Reference with regard to a model for service provider choice at process request time may be made to Grabarnik et al., "Management of Service Process QoS in a Service Provider—Service Supplier Environment," 9th IEEE International Conference on E-Commerce, Workshop on Global Business Services Delivery Platforms (CEC-EEE 07) 2007.

Reference with regard to loops in flow graphs, reducing loops in flow graphs and an introduction to global data-flow analysis may be made to Aho et al., "Compilers: Principles, Techniques, and Tools," pp. 602-623, Aug. 31, 2006, 2nd edition.

Reference with regard to a multi-tier SLA method and system may be made to commonly-assigned U.S. Pat. No. 7,099,936 to Chase et al., "Multi-tier Service Level Agreement Method And System."

Reference with regard to a design rationale of a business-objectives-based utility computing SLA management system (SAM) and implementation experiences relating thereto may be made to Buco et al., "Utility computing SLA management based upon business objectives," IBM Systems Journal, Vol. 43, No. 1, 2004.

Reference with regard to a quality-of-service (QoS) assured composeable service infrastructure (QUEST) and management of QoS provisioning for composed services (e.g., based on the SLA contracts of individual services) may be made to Gu et al., "QoS-Assured Service Composition in Managed Service Overlay Networks," Proceedings of the 23rd International Conference on Distributed Computing Systems (ICDCS'03) 2003.

The exemplary embodiments of the invention provide computer programs, methods and apparatus that describe techniques for improved evaluation of agreements between entities, such as SLAs between a service provider and another entity (e.g., a supplier or customer of the service provider), for example. Below, exemplary stochastic business processes are described with particular reference as to how statistical characteristics can be evaluated based on statistical properties of atomic processes and form of workflow.

In order to describe various exemplary business processes, consider SySBPs. Below, as a non-limiting example, the workflow of a BP will be modeled as a DAG with nodes being APs or processes that are considered atomic under the chosen scope of consideration. As an example, suppose that each AP has one input and one output. APs are connected by edges (arrows) directed in the direction of the call or sequence of execution in such a way that the output of the previous AP is used in the input of the following AP. For further convenience, suppose that the BP has one input (start) and one output (stop). Note that this supposition does not create additional restrictions on the BP since one can add start and/or stop nodes and connect the respective start/stop node with all possible external inputs/outputs. Further note that none of the suppositions or examples listed above should be seen as limiting or otherwise restricting the practice of exemplary embodiments of the invention and further are employed merely for purposes of illustration.

Next, extend the notion of the BP by adding synchronizing elements such as "split," "switch," "join" or "merge." Synchronization elements allow for further control of the workflow by splitting the flow into multiple sub-flows or by combining multiple flows into one, as non-limiting examples.

Split and switch are output synchronization elements. They have one input and multiple outputs. Split has one input and multiple outputs of the same flow. Switch allows for choosing one out of possible n outputs. As non-limiting examples, the choice in a switch may be based on a value of a Boolean or arithmetical expression. Split and switch correspond to elementary synchronization between possible outputs.

Join and merge are input synchronization elements. They have multiple inputs and one output. Join acts by locking until all inputs of the join have a flow (similar to an "And" gate or operation). Merge allows a flow from any input to its output (i.e., any input triggers the output, similar to an "Or" gate or operation). Join and merge correspond to elementary synchronization between possible inputs.

In principle, there are different ways for combining inputs and/or outputs together. For example, one may have a case where every two out of three possible tree outputs participate in split of the flow. In this case, a combination of the input synchronization elements is used. The actual combination may be generated by using methods of Boolean algebra. Combining more then one join and split, one can cover an extensive set of the possible variants of the output synchronizations. In a similar manner, combinations of merges and joins can cover an extensive set of the input synchronizations.

The next step is to consider stochastic behavior of the business processes. These business processes individually may be referred to as a stochastic SyBP or a SySBP. Different elements have different types of stochastic behavior. For atomic processes, one usually considers an execution time or time that shows how fast flow is processed by the AP. Split, merge and join are not influence by addition of the stochastic. However, switch may change behavior stochastically. The simplest form of stochastic for switch is when a branch of the output is chosen with some fixed probability.

The next step from a simplified model of the BPs to the more realistic models is by adding a level of parallelization for the APs. Parallelization of the synchronizing elements may be emulated by a combination of the synchronizing elements, as in the above example. A parallelization level p of an AP shows how many parallel requests the AP can execute. Under very low frequency of requests, parallelization does not affect the final execution time. However, with the growth of the requests' frequency, the effect of parallelization becomes higher.

As a first example, consider very rare requests to a SySBP that contains only one $AP_1$ with constant processing time $t_1$ and a parallelization number $p_1=1$. Let $t_1=4$ and let the time between requests (tri) be 8 ($t_{r1}=8$). Since the time between requests $t_{r1}$ is greater than the processing time $t_1$ (i.e., requests are rare, $t_{r1}>t_1$), it is expected that requests will routinely be processed in time $t_1$ (i.e., that requests will be processed as they are received).

Note that the time between requests $t_r$ (i.e., period) is related to the frequency of requests $f_r$ by the following equation which is well known in the art:

$$f_r = 1/t_r \qquad (1)$$

Thus, in the first example above, $f_{r1}=\frac{1}{8}$.

Now consider a second example with the above SySBP and $AP_1$, only let $t_{r2}=2$ (i.e., the requests are more frequent, $t_{r2}<t_1$). The processing time $t_1$ for each request remains the same ($t_1=4$), however now requests will not be processed as they are received since the $AP_1$ is receiving requests faster than it can process them. Note that in this second example, $f_{r2}=\frac{1}{2}$.

In order to better describe the situation, one may wish to consider the "throughput" of the SySBP/AP instead of the execution time. Throughput is herein defined as an amount of data (e.g., requests) per time unit that a process (e.g., AP, BP) is capable of handling (i.e., processing).

Assuming that an $AP_n$ has a constant processing time $t_n$ and a parallelization of $p_n$, the throughput ($th_n$) of the $AP_n$ will be equal to the parallelization divided by the processing time. That is:

$$th_n = p_n/t_n \quad (2)$$

Note that the throughput of the AP is independent of the time between requests $t_r$ (and independent of the frequency of requests $f_r$, see equation (1)). Further note that the throughput appears to be similar to the frequency of requests $f_r$ given in equation (1). That is, the frequency of requests $f_r$ is indicative of a number of requests received per time unit while throughput $th_n$ is indicative of a number of requests that can be processed per time unit.

The parallelization level of an AP directly affects the throughput for that AP. As may be appreciated, a higher parallelization level will enable an AP to achieve a higher throughput. Since the AP is one of a number of APs being used in the workflow model of a BP, the throughput of individual APs may be significant when considering the overall performance of the BP. It should be understood that the use of the word "throughput" herein corresponds to the maximum throughput (i.e., capacity) of the process in question. The word "maximum" is omitted for brevity. The actual (i.e., current) throughput of a process will be referred to as such.

Since one concern in the workflow model is the effect of the AP's performance on the overall BP, it may be desirable to consider the throughput of the AP. That is, one question that may be considered is whether or not the throughput (i.e., capacity) of the AP is adequate. If the capacity is too low, the AP will not be able to process requests fast enough and a bottleneck may occur (i.e., the AP may slow down the overall operation of the BP). As noted above, the capacity of an AP may be increased by a higher level of parallelization.

Utilizing this notion of throughput, consider again the first and second examples above. In both examples, since the parallelization $p_1$ and the processing time $t_1$ are the same, $th_1=\frac{1}{4}$. In the first example, $f_{r1}=\frac{1}{8}$. As is apparent, $th_1>f_{r1}$ and the $AP_1$ is capable of processing the requests as they are received. In the second example, $f_{r2}=\frac{1}{2}$. Thus, $f_{r2}>th_1$ and the $AP_1$ is not capable of processing the requests as they are received.

As a third example, consider an $AP_2$ similar to the $AP_1$ above, where $t_2=4$. However, instead of a parallelization of 1 ($p_1=1$), let $AP_2$ have a parallelization of 4 ($p_2=4$). This gives $AP_2$ a throughput $th_2$ of 4/4 or 1 ($p_2/t_2$). In this third example, due to the higher parallelization, $AP_2$ is capable of handling both $t_r$ values of 8 ($f_{r1}=\frac{1}{8}$) and 2 ($f_{r2}=\frac{1}{2}$) since $th_2>f_{r1}$ and $th_2>f_{r2}$.

It should be noted that while the above examples use a static value of throughput and frequency of requests (time between requests), the exemplary embodiments are not limited thereto and may be utilized, for example, in conjunction with distributions (e.g., probability distributions) of throughput and/or frequency of requests (time between requests). Static values are considered to be a particular example or subset of distributions.

Clearly, based on the above one can see that throughput may be significant when considering a BP modeled with one or more APs, each AP having a distribution of throughput. Furthermore, it may be desirable to consider the throughput of a SySBP instead of the execution time.

With this in mind, the results of Grabarnik et al. (see above) may be further considered and reformulated by using throughput instead of execution time and extending the results by taking into account the notion of parallelization level.

In Grabarnik et al., it was established that for the case when SySBP is a DAG, there exists a function d defined on the APs of the SySBP representing distance from the stop AP. The function d allows for reduction of the SySBP by transforming the SySBP to another SySBP with similar behavior and a smaller number of APs.

During each reduction step, APs that are reduced (i.e., combined) change their statistical characteristics. One can formulate changes of the throughput at each step (i.e., determining the throughput of the combined APs) as an influence on statistical properties of the result such as APs and synchronization elements.

As a non-limiting example, consider a simple network of two sequential APs, $AP_1$ and $AP_2$, with distributions of processing time (i.e., execution time) $t_1$ and $t_2$ and parallelization numbers $p_1$ and $p_2$, respectively. The combined throughput can be expressed as:

$$th_{comb}=1/(t_1/p_1+t_2/p_2)=p_1p_2/(p_1t_2+p_2t_1)=1/(1/th_1+1/th_2) \quad (3)$$

For a merge of two branches with distributions $t_1$ and $t_2$ of the execution times and parallelization numbers $p_1$ and $p_2$, one will have:

$$th_{comb}=1/\min(t_1/p_1,t_2/p_2)=\max(p_1/t_1,p_2/t_2)=\max(th_1,th_2) \quad (4)$$

As a non-limiting example, if the parallelization number is not defined, one may set it equal to 1.

For a join of two branches with distributions $t_1$ and $t_2$ of the execution time and parallelization numbers $p_1$ and $p_2$, one will have:

$$th_{comb}=1/\max(t_1/p_1,t_2/p_2)=\min(p_1/t_1,p_2/t_2)=\min(th_1,th_2) \quad (5)$$

Split has no affect on the throughput.

Switch is not affected by the parallelization number, but transforms distribution of the execution time by multiplying the probability (i.e., the distribution of throughput) by the probability of choosing one of the branches.

Summarizing the above, one may conclude that there exists an iterative procedure that allows for calculation of the combined throughput of a SySBP. Note that in some rare cases iterative steps may be performed analytically and the combined distribution of the throughput may be calculated in the final form.

Proposition: Let SySBP include some combination of APs, splits, switches, joins, and/or merges. Furthermore, assume that all loops in the BP are natural (i.e., this is a reducible SySBP). There exists a sequential stochastic reduction procedure that allows one to calculate a combined distribution of the execution time.

Outline of the Proof: For definitions used in the below outline see Aho et al. (cited above). Since one is considering a BP with natural loops only, every pair of loops is either embedded one within another or they are external one to the other. It is also possible that a number of loops have the same head. Choose a loop with the header AP that is not dominated by the header of any other loop and denote it by $AP_i$. If there is more than one such head AP, choose one of them at random.

Now consider the set $S_i$ of all loops that have $AP_i$ as their head. Choose a loop from $S_i$ that does not have an inner loop. "Unwind" the loop by removing the edge that goes from the dominated AP to the dominating AP and replace all the distributions in the loop in such a way that the final distribution will be equivalent to the one with the removed edge. The resulting distributions remain the same, but the number of natural loops has been reduced by one.

This procedure constitutes the induction step. By repeating this procedure one can reduce a SySBP having natural loops to a SySBP without loops. In addition, for the proof by induction one needs to consider the case of a SySBP that does not have any loops; i.e., the SySBP is a DAG with elements of type AP, split, switch, join and merge. The case of the BP being a DAG (without switch) is discussed in Grabarnik et al. (cited above).

The proof can be extended to the case where the DAG contains switches. Thus, all possible cases used in the statement of the Proposition have been covered, completing the outline of the proof. Note that according to Aho et al., graphs having only natural loops are the most frequent type appearing in practical applications.

One exemplary use for obtaining (e.g., determining, computing) a distribution of the overall throughput of a BP is to determine whether an agreement relating to the BP is fit based on the determined overall distribution of throughput. This may be particularly useful for a service provider in attempting to meet the needs of a customer. For example, if a SLA is not suitable for the BP and cannot provide or meet a desired throughput, it may be desirable to use a different SLA or pursue alternatives (e.g., find a new supplier, use a different supplier, consult with the client, etc.).

Figure 2:
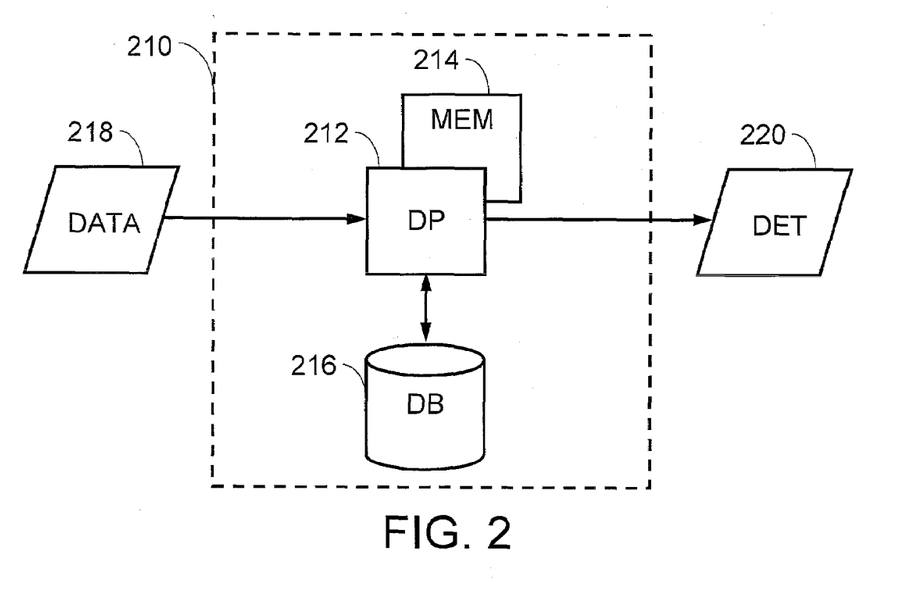
FIG. 2 illustrates a simplified block diagram of an electronic device that is suitable for use in practicing the exemplary embodiments of this invention.

FIG. 2 illustrates a simplified block diagram of an electronic device 210 that is suitable for use in practicing the exemplary embodiments of this invention. The electronic device 210 includes a data processor (DP) 212 coupled to a memory (MEM) 214 and a database (DB) 216 coupled to the DP 212. The DB 216 may store at least one agreement (e.g., SLAs, OLAs). The DP 212 is configured to obtain a workflow model comprising a plurality of APs, each AP having a distribution of throughput. The DP 212 is further configured to determine an overall distribution of throughput for the workflow model using the distributions of throughput of the APs and to output a determination (DET) 220 of whether an agreement relating to the workflow model is fit based on the determined overall distribution of throughput.

The DP 212 may be configured to receive data 218 and to perform various operations on the data 218. Based on the results of the operations, the DP 212 may determine whether an agreement relating to the workflow model is fit based on a determined overall distribution of throughput for the workflow model. The data 218 may comprise a workflow model of the BP comprised of a plurality of APs, each AP having at least a distribution of throughput. In some exemplary embodiments, instead of the data 218 comprising the model and distributions, the model and distributions may stored in and retrieved from the MEM 214 and/or the DB 216. As non-limiting examples, the DET 220 may be output to a display device (e.g., a monitor), a printing device (e.g., a printer) or another electronic device (e.g., a computer). In other exemplary embodiments, the electronic device 210 comprises a communication component and is coupled to a network. In further exemplary embodiments, the DP 212, MEM 214 and/or DB 216 receive updates via the network.

In other exemplary embodiments, the data processor is further configured to generate the workflow model of the BP. In other exemplary embodiments, the agreement comprises at least one of a service level agreement or an operational level agreement. In further exemplary embodiments, the agreement is between a first entity and a second entity, the first entity comprising a service provider and the second entity comprising at least one of a supplier or a customer.

The exemplary embodiments of this invention may be carried out by computer software implemented by the DP 212 or by hardware, or by a combination of hardware and software. As a non-limiting example, the exemplary embodiments of this invention may be implemented by one or more integrated circuits. The MEM 214 may be of any type appropriate to the technical environment and may be implemented using any appropriate data storage technology, such as optical memory devices, magnetic memory devices, semiconductor-based memory devices, fixed memory and removable memory, as non-limiting examples. The DP 212 may be of any type appropriate to the technical environment, and may encompass one or more of microprocessors, general purpose computers, special purpose computers and processors based on a multi-core architecture, as non-limiting examples.

Exemplary embodiments of the invention can take the form of an entirely hardware embodiment, an entirely software embodiment or an embodiment containing both hardware and software elements. In a typical embodiment, the invention is implemented in software, which includes but is not limited to firmware, resident software and/or microcode, as non-limiting examples. Generally, various exemplary embodiments of the invention can be implemented in different mediums, such as software, hardware, logic, special purpose circuits or any combination thereof. As a non-limiting example, some aspects may be implemented in software which may be run on a computing device, while other aspects may be implemented in hardware.

Furthermore, exemplary embodiments of the invention can take the form of a computer program product accessible from a computer-useable or computer-readable medium providing program code for use by or in connection with a computer or any instruction execution system. For the purposes of this description, a computer-useable or computer-readable medium can be any apparatus that can contain, store, communicate, propagate, or transport the program for use by or in connection with the instruction execution system, apparatus, or device.

The medium can be electronic, magnetic, optical, electromagnetic, infrared, a semiconductor system (or apparatus or device) or a propagation medium, as non-limiting examples. Non-limiting examples of a computer-readable medium include a semiconductor or solid state memory, magnetic tape, a removable computer diskette, a random access memory (RAM), a read-only memory (ROM), a rigid magnetic disk and an optical disk. Current, non-limiting examples of optical disks include compact disk—read only memory (CR-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or indirectly through intervening I/O controllers.

Network adapters may also be coupled to the system to enable the data processing system to become coupled to other data processing systems or remote printers or storage devices through intervening private or public networks. Modems, cable modem and Ethernet cards are just a few non-limiting examples of the currently available types of network adapters.

Below are further descriptions of various non-limiting, exemplary embodiments of the invention. The below-described exemplary embodiments are numbered separately for clarity purposes. This numbering should not be construed as entirely separating the various exemplary embodiments since aspects of one or more exemplary embodiments may be practiced in conjunction with one or more other aspects or exemplary embodiments.

Figure 3:
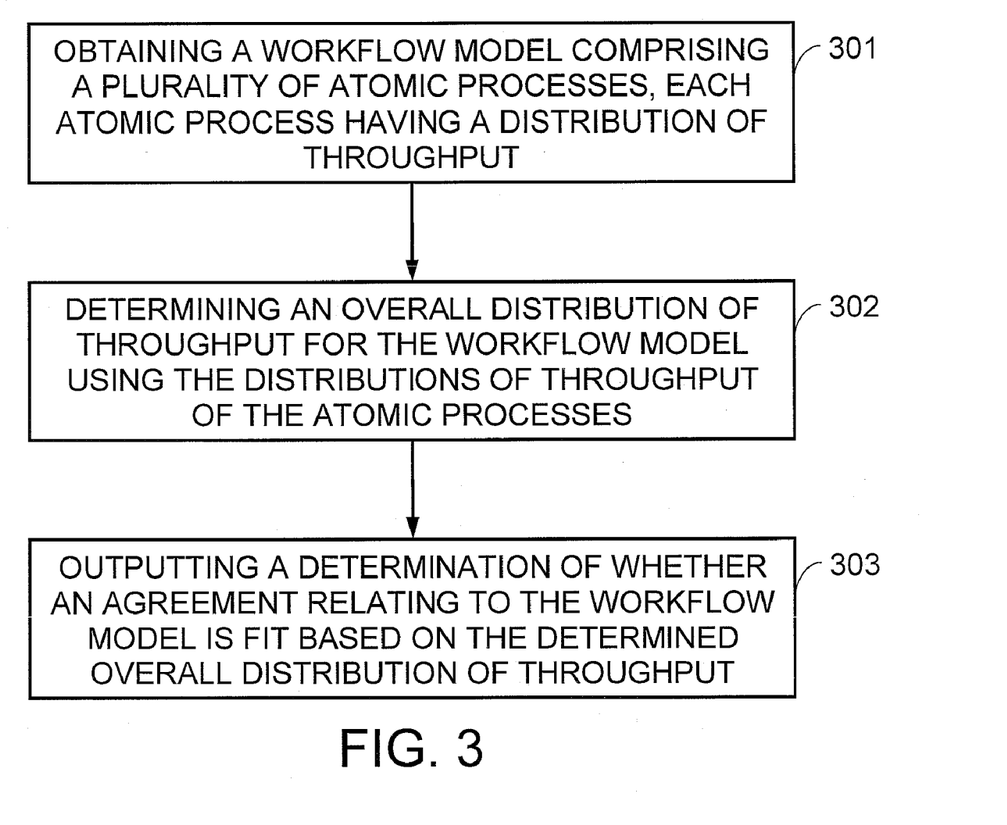
FIG. 3 depicts a flowchart illustrating one non-limiting example of a method for practicing the exemplary embodiments of this invention.

(1) In one exemplary embodiment, and as shown in FIG. 3, a method comprising: obtaining a workflow model comprising a plurality of atomic processes, each atomic process having a distribution of throughput (301); determining an overall distribution of throughput for the workflow model using the distributions of throughput of the atomic processes (302); and outputting a determination of whether an agreement relating to the workflow model is fit based on the determined overall distribution of throughput (303).

A method as above, wherein determining an overall distribution of throughput for the workflow model comprises at least one of removing a loop from the workflow model or combining at least two atomic processes. A method as in any above, wherein the determination of whether an agreement is fit is further based on an overall distribution of execution time for the workflow model. A method as in any above, further comprising: determining the overall distribution of execution time for the workflow model using distributions of execution time of the atomic processes. A method as in any above, wherein the determination of whether an agreement is fit is further based on a profit and loss function for the agreement. A method as in any above, wherein the determined overall distribution of throughput for the workflow model is further based on a parallelization level of the atomic processes. A method as in any above, wherein the workflow model is representative of a business process. A method as in any above, wherein the method is implemented by a computer program.

(2) In another exemplary embodiment, a program storage device readable by a machine, tangibly embodying a program of instructions executable by the machine for performing operations, said operations comprising: obtaining a workflow model comprising a plurality of atomic processes, each atomic process having a distribution of throughput (301); determining an overall distribution of throughput for the workflow model using the distributions of throughput of the atomic processes (302); and outputting a determination of whether an agreement relating to the workflow model is fit based on the determined overall distribution of throughput (303).

A program storage device as above, wherein determining an overall distribution of throughput for the workflow model comprises at least one of removing a loop from the workflow model or combining at least two atomic processes. A program storage device as in any above, wherein the determination of whether an agreement is fit is further based on an overall distribution of execution time for the workflow model. A program storage device as in any above, said operations further comprising: determining the overall distribution of execution time for the workflow model using distributions of execution time of the atomic processes. A program storage device as in any above, wherein the determination of whether an agreement is fit is further based on a profit and loss function for the agreement. A program storage device as in any above, wherein the determined overall distribution of throughput for the workflow model is further based on a parallelization level of the atomic processes. A program storage device as in any above, wherein the workflow model is representative of a business process.

(3) In a further exemplary embodiment, a processing device comprising: an input configured to receive a workflow model comprising a plurality of atomic processes, each atomic process having a distribution of throughput; a processing unit coupled to the input and configured to determine an overall distribution of throughput for the workflow model using the distributions of throughput of the atomic processes; and an output coupled to the processing unit and configured to output a determination of whether an agreement relating to the workflow model is fit based on the determined overall distribution of throughput.

A processing device as above, wherein the processing unit determining an overall distribution of throughput for the workflow model comprises at least one of the processing unit removing a loop from the workflow model or the processing unit combining at least two atomic processes. A processing device as in any above, wherein the determination of whether an agreement is fit is further based on an overall distribution of execution time for the workflow model. A processing device as in any above, wherein the processing unit is further configured to determine the overall distribution of execution time for the workflow model using distributions of execution time of the atomic processes. A processing device as in any above, wherein the determination of whether an agreement is fit is further based on a profit and loss function for the agreement. A processing device as in any above, wherein the determined overall distribution of throughput for the workflow model is further based on a parallelization level of the atomic processes. A processing device as in any above, wherein the workflow model is representative of a business process.

(4) In a further exemplary embodiment, a processing device comprising: means for obtaining a workflow model comprising a plurality of atomic processes, each atomic process having a distribution of throughput; means for determining an overall distribution of throughput for the workflow model using the distributions of throughput of the atomic processes; and means for outputting a determination of whether an agreement relating to the workflow model is fit based on the determined overall distribution of throughput.

A processing device as above, wherein the means for determining an overall distribution of throughput for the workflow model is further for at least one of removing a loop from the workflow model or combining at least two atomic processes. A processing device as in any above, wherein the determination of whether an agreement is fit is further based on an overall distribution of execution time for the workflow model. A processing device as in any above, further comprising: means for determining the overall distribution of execution time for the workflow model using distributions of execution time of the atomic processes. A processing device as in any above, wherein the determination of whether an agreement is fit is further based on a profit and loss function for the agreement. A processing device as in any above, wherein the determined overall distribution of throughput for the workflow model is further based on a parallelization level of the atomic processes. A processing device as in any above, wherein the workflow model is representative of a business process.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device readable by a machine, tangibly embodying a program of instructions executable by the machine for performing operations. The operations comprise steps of utilizing the exemplary embodiments or steps of the method.

Any use of the terms "connected," "coupled" or variants thereof should be interpreted to indicate any such connection or coupling, direct or indirect, between the identified elements. As a non-limiting example, one or more intermediate elements may be present between the "coupled" elements. The connection or coupling between the identified elements may be, as non-limiting examples, physical, electrical, magnetic, logical or any suitable combination thereof in accordance with the described exemplary embodiments. As non-limiting examples, the connection or coupling may comprise one or more printed electrical connections, wires, cables, mediums or any suitable combination thereof.

Generally, various exemplary embodiments of the invention can be implemented in different mediums, such as software, hardware, logic, special purpose circuits or any combination thereof. As a non-limiting example, some aspects may be implemented in software which may be run on a computing device, while other aspects may be implemented in hardware.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications will still fall within the scope of the teachings of the exemplary embodiments of the invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method for determining whether an agreement for a process is fit, where the agreement relates to provisioning of information technology services, comprising:
    obtaining, by an apparatus, a workflow model representative of the process, wherein the process comprises a plurality of atomic sub-processes, wherein each atomic sub-process has a probability distribution of throughput, wherein the throughput of an atomic sub-process is indicative of a number of requests that the atomic sub-process is capable of processing per time unit, wherein the agreement defines contractual commitments for interactions occurring between at least two entities in accordance with the process, where the agreement relates to provisioning of information technology services;
    determining, by the apparatus, an overall probability distribution of throughput for the process using the probability distributions of throughput of the atomic sub-processes and the workflow model, wherein the throughput of the process is indicative of a number of requests that the process is capable of processing per time unit, wherein the determined overall probability distribution of throughput for the process is further based on a parallelization level of the atomic sub-processes, wherein the parallelization level of an atomic sub-process is indicative of a number of parallel requests that the atomic sub-process is capable of concurrently executing, where at least one atomic sub-process is characterized by a switch element, wherein the switch element is an output synchronization element that allows for choosing one of n possible outputs, wherein the switch element is unaffected by the parallelization level of the at least one atomic sub-process, wherein the switch element transforms a probability distribution of execution time for the at least one atomic sub-process by multiplying the probability distribution of execution time by a probability of choosing the one of n possible outputs; and
    outputting, by the apparatus, a determination of whether the agreement for the process is fit based on the determined overall probability distribution of throughput, wherein the determination of whether the agreement is fit is further based on an overall probability distribution of execution time for the process and a profit and loss function for the agreement.

2. The method as in claim 1, wherein determining an overall probability distribution of throughput for the process comprises removing a loop from the workflow model.

3. The method as in claim 1, further comprising: determining the overall probability distribution of execution time for the process using probability distributions of execution time of the atomic sub-processes.

4. A program storage device readable by a machine, tangibly embodying a program of instructions executable by the machine for performing operations to determine whether an agreement for a process is fit where the agreement relates to provisioning of information technology services, said operations comprising:
    obtaining a workflow model representative of the process, wherein the process comprises a plurality of atomic sub-processes, wherein each atomic sub-process has a probability distribution of throughput, wherein the throughput of an atomic sub-process is indicative of a number of requests that the atomic sub-process is capable of processing per time unit, wherein the agreement defines contractual commitments for interactions occurring between at least two entities in accordance with the process, where the agreement relates to provisioning of information technology services;
    determining an overall probability distribution of throughput for the process using the probability distributions of throughput of the atomic sub-processes and the workflow model, wherein the throughput of the process is indicative of a number of requests that the process is capable of processing per time unit, wherein the determined overall probability distribution of throughput for the process is further based on a parallelization level of the atomic sub-processes, wherein the parallelization level of an atomic sub-process is indicative of a number of parallel requests that the atomic sub-process is capable of concurrently executing, where at least one atomic sub-process is characterized by a switch element, wherein the switch element is an output synchronization element that allows for choosing one of n possible outputs, wherein the switch element is unaffected by the parallelization level of the at least one atomic sub-process, wherein the switch element transforms a probability distribution of execution time for the at least one atomic sub-process by multiplying the probability distribution of execution time by a probability of choosing the one of n possible outputs; and outputting a determination of whether the agreement for the process is fit based on the determined overall probability distribution of throughput, wherein the determination of whether the agreement is fit is further based on overall probability distribution of execution time for the process and a profit and loss function for the agreement.

5. The program storage device as in claim 4, wherein determining an overall probability distribution of throughput for the process comprises removing a loop from the workflow model.

6. The program storage device as in claim 4, said operations further comprising: determining the overall probability distribution of execution time for the process using probability distributions of execution time of the atomic sub-processes.

7. The program storage device as in claim 4, wherein the workflow model is representative of a business process.

8. A processing device comprising:

an input configured to receive a workflow model representative of a process, wherein the process comprises a plurality of atomic sub-processes, wherein each atomic sub-process has a probability distribution of throughput, wherein the throughput of an atomic sub-process is indicative of a number of requests that the atomic sub-process is capable of processing per time unit, wherein the agreement defines contractual commitments for interactions occurring between at least two entities in accordance with the process, where the agreement relates to provisioning of information technology services;

a processing unit configured to determine an overall probability distribution of throughput for the process using the probability distributions of throughput of the atomic sub-processes and the workflow model, wherein the throughput of the process is indicative of a number of requests that the process is capable of processing per time unit, wherein the determined overall probability distribution of throughput for the process is further based on a parallelization level of the atomic sub-processes, wherein the parallelization level of an atomic sub-process is indicative of a number of parallel requests that the atomic sub-process is capable of concurrently executing, where at least one atomic sub-process is characterized by a switch element, wherein the switch element is an output synchronization element that allows for choosing one of n possible outputs, wherein the switch element is unaffected by the parallelization level of the at least one atomic sub-process, wherein the switch element transforms a probability distribution of execution time for the at least one atomic sub-process by multiplying the probability distribution of execution time by a probability of choosing the one of n possible outputs; and an output configured to output a determination of whether the agreement for the process is fit based on the determined overall probability distribution of throughput, wherein the determination of whether the agreement is fit is further based on an overall probability distribution of execution time for the process and a profit and loss function for the agreement.

9. The processing device as in claim 8, wherein the processing unit determining an overall probability distribution of throughput for the process comprises the processing unit removing a loop from the workflow model.

* * * * *